United States Patent [19]
Murphy et al.

[11] Patent Number: 6,162,059
[45] Date of Patent: Dec. 19, 2000

[54] PROBLEM SOLVING SKILLS DEVELOPMENT SYSTEM USING TACTILE RECOGNITION

[76] Inventors: Kevin Murphy; Janice Murphy, both of 97 Forrest St., Plaistow, N.H. 03865

[21] Appl. No.: 09/270,161

[22] Filed: Mar. 16, 1999

[51] Int. Cl.[7] .............................. G09B 1/10; G09B 21/00
[52] U.S. Cl. ..................... 434/112; 434/113; 273/153 S
[58] Field of Search .......................... 434/112–114, 159, 434/170, 172, 403–405, 365; 273/153 S, 157 A, 157 R; 446/118

[56] References Cited

U.S. PATENT DOCUMENTS

| | | |
|---|---|---|
| 565,179 | 8/1896 | Rhodes . |
| 941,680 | 11/1909 | Houghton ............................ 273/157 R |
| 1,101,567 | 6/1914 | Ridgway .............................. 273/153 S |
| 1,636,371 | 7/1927 | Kenney ................................ 273/157 R |
| 1,741,669 | 12/1929 | Wilson . |
| 1,823,130 | 9/1931 | Smith . |
| 4,846,687 | 7/1989 | White et al. ............................ 434/112 |
| 4,880,384 | 11/1989 | Murphy . |
| 5,013,245 | 5/1991 | Benedict ................................ 434/170 |
| 5,096,317 | 3/1992 | Phillippe . |
| 5,267,732 | 12/1993 | Bowen et al. ........................ 273/153 S |
| 5,275,567 | 1/1994 | Whitfield ............................... 434/113 |
| 5,364,272 | 11/1994 | Herman et al. ......................... 434/159 |
| 5,391,078 | 2/1995 | Murphy . |
| 5,450,078 | 9/1995 | Silva et al. . |
| 5,536,170 | 7/1996 | Murphy . |
| 5,551,877 | 9/1996 | Murphy . |
| 5,769,418 | 6/1998 | Gilbert et al. ....................... 273/157 A |
| 5,816,571 | 10/1998 | Chen .................................. 273/153 S |
| 5,820,377 | 10/1998 | Murphy et al. ......................... 434/113 |
| 6,059,575 | 5/2000 | Murphy ................................. 434/112 |

FOREIGN PATENT DOCUMENTS 1300608  12/1972  United Kingdom .

*Primary Examiner*—Joe H. Cheng
*Attorney, Agent, or Firm*—Bourque & Associates, P.A.

[57] ABSTRACT

The problem solving skills development system is used, for example, as a puzzle or game, to develop problem solving or analytical skills in visually impaired individuals. The system includes a supporting board having sliding pieces arranged in a grid, for example, a 4 by 4 grid of 15 sliding pieces and one empty position. The sliding pieces include tactilely recognizable regions that are arranged into a predetermined pattern by sliding and shifting the appropriate pieces. The tactilely recognizable regions can include characters, such as letters that can be arranged to form words or phrases, numbers that can be arranged in numerical order, or any other symbols. Some of the tactilely recognizable regions can also include blank surfaces to make the puzzle easier for individuals at lower ages or abilities. The system preferably includes tactile recognition blocks that have the tactilely recognizable regions and that can be removably engaged with the sliding pieces. The tactile recognition blocks can thereby be used to adapt the system to be used as different types of puzzles with different degrees of difficulty.

15 Claims, 4 Drawing Sheets

PROBLEM SOLVING SKILLS DEVELOPMENT SYSTEM USING TACTILE RECOGNITION

FIELD OF THE INVENTION

The present invention relates to problem solving skills development systems for use by visually impaired individuals, and more particularly, to a puzzle or game using tactile recognition, such as Braille.

BACKGROUND OF THE INVENTION

Numerous systems have been created to facilitate communication with or teaching of visually impaired individuals using a tactile recognition language, such as Braille. The TACK-TILES® Braille System, for example, includes a system of blocks having Braille characters together with the corresponding visual characters. The Braille blocks can be interchangeably attached to a slate to create words, sentences, paragraphs, and other expressions, which are readable by both the visually impaired individual and the non-visually impaired individual, such as a teacher or relative. This system, described in greater detail in U.S. Pat. Nos. 4,880,384; 5,391,078; and 5,820,377, has revolutionized the teaching of Braille and communication using Braille with individuals of all ages.

With visually impaired individuals, however, the focus has primarily been on teaching these individuals how to communicate and not on developing problem solving or analytical skills. Many puzzles and games that develop problem solving and analytical skills have not had any useful application for visually impaired individuals. Also, some puzzles or games may be usable by individuals at a high skill level but not by others at a lower skill level. Thus, many visually impaired individuals do not have the opportunity to develop the problem solving and analytical skills needed to succeed in other "every day" activities.

Accordingly, a need exists for a problem solving skills development system, such as a puzzle or game, that can be used by visually impaired individuals to help develop problem solving or analytical skills. A need also exists for a puzzle or game that can be adapted for use in a number of different ways by individuals of different ages and abilities. A need further exists for a problem solving skills development system that can be used with the Braille blocks of the TACK-TILES® Braille System.

SUMMARY OF THE INVENTION

The present invention features a problem solving skills development system using a tactile recognition language. The system comprises a supporting board having a generally rectangular flat surface and having first, second, third and fourth retaining sides around a periphery of the generally rectangular flat surface. The system further comprises a plurality of sliding pieces slidably disposed on the rectangular flat surface and arranged in a grid having positions. Each of the sliding pieces has first, second, third and fourth sides engaging with at least one of the other sliding pieces, and the retaining sides retain the sliding pieces on the generally rectangular flat surface. A tactilly recognizable region is disposed on at least two of the sliding pieces. The sliding pieces are adapted to slide into the positions such that the tactilly recognizable regions on the sliding pieces are arranged into a predetermined pattern.

According to the preferred embodiment, the system includes a plurality of tactile recognition blocks having the tactilly recognizable region on a surface thereof. Each of the plurality of tactile recognition blocks are removably engageable with the sliding pieces. Alternatively, the tactilly recognizable region is disposed on a top surface of the sliding pieces. The tactilly recognizable regions include characters to be arranged in a predefined pattern as well as blank surfaces.

In one example, the first and second sides of each of the sliding pieces include tabs and the third and fourth sides of each of the sliding pieces include grooves that are slidably engageable with the tabs of the sliding pieces. The first and second retaining walls include grooves for slideably engaging the tabs on the sliding pieces and the third and fourth retaining walls include tabs for slideably engaging the grooves on the sliding pieces. At least one of the positions is an empty position and the sliding pieces adjacent the empty position are slidable into the empty position. In one example, the sliding pieces include fifteen (15) sliding pieces arranged in a 4 by 4 grid having sixteen positions.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
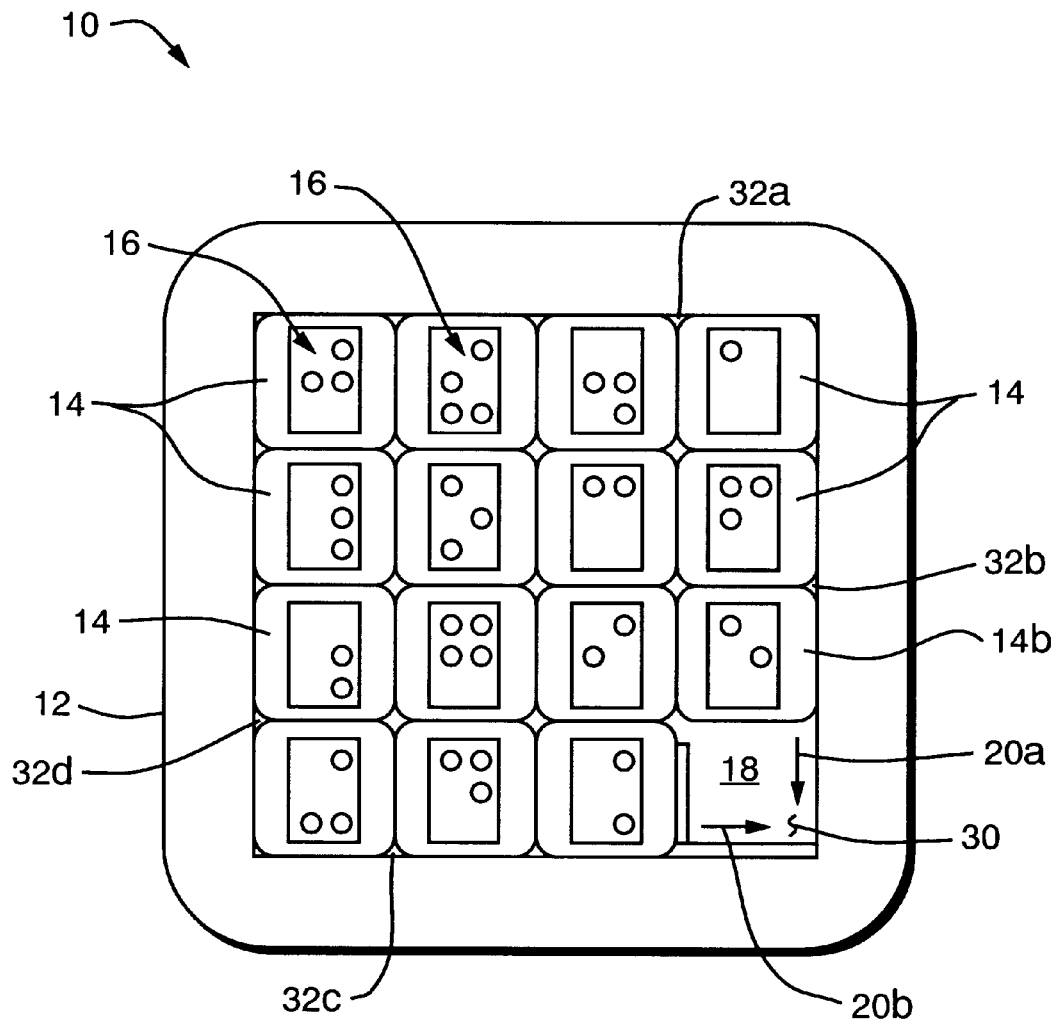
FIG. 1 is a top view of a problem solving skills development system using tactile recognition, according to the present invention.

The problem solving skills development system 10, FIG. 1, according to the present invention, can be used as a puzzle or game by visually impaired individuals of any age or ability to develop problem solving or analytical skills. The system 10 can also be used by individuals with other types of disabilities (e.g., dyslexia) as well as their instructors. The system 10 includes a supporting board 12 and a plurality of sliding pieces 14 slidably disposed on the supporting board and arranged in a grid pattern. A tactilly recognizable region 16 is disposed on each of the sliding pieces 14 and represents a character, such as a Braille character, or any other type of symbol, or a blank space. The sliding pieces 14 can be shifted to different positions within the grid such that the tactilly recognizable regions 16 can be aligned to form a pattern, such as a numeric sequence, the alphabet, a word, or any other combination of two or more letters, numbers, or any other type of symbol.

In the exemplary embodiment, fifteen (15) sliding pieces 14 are arranged in a 4 by 4 grid of positions with one empty position 18 located anywhere within the grid. Any of the sliding pieces 14a, 14b adjacent the empty position 18 can slide into that position 18, as shown for example by the arrows 20a, 20b, thereby creating a new empty position. Each of the sliding pieces 14 with the tactilly recognizable regions 16 can thereby be moved around the supporting board 12 to any one of the positions in the grid by shifting the appropriate sliding pieces 14. Although a 4 by 4 grid is shown in the exemplary embodiment, the problem solving skills development system 10 of the present invention can have sliding pieces 14 forming grids of any size or shape.

Figure 2:
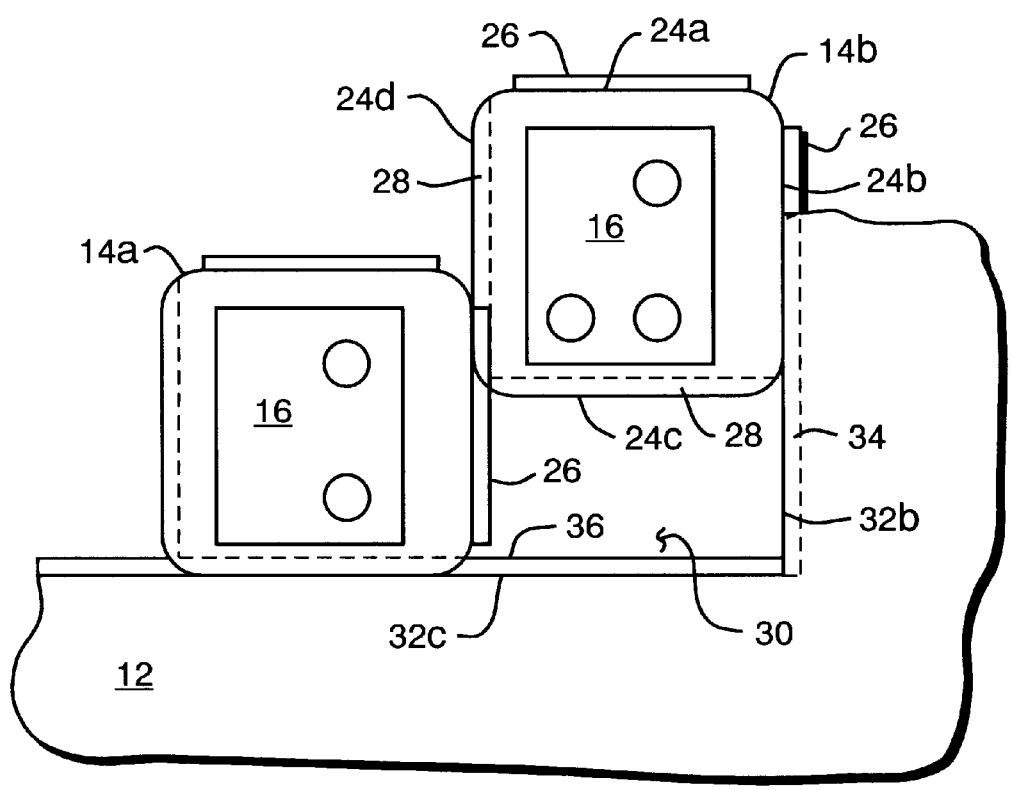
FIG. 2 is a partial exploded view of the sliding pieces engaged with the supporting board in the problem solving skills development system, according to the present invention.

According to the exemplary embodiment, each of the sliding pieces 14, FIG. 2, has a generally rectangular shape with first, second, third, and fourth sides 24a–24d. The first and second sides 24a, 24b include tabs 26 and the third and fourth sides 24c, 24d include grooves 28. The tabs 26 on each of the sliding pieces 14a are adapted to slidably engage grooves 28 on adjacent sliding pieces 14b. The exemplary embodiment of the supporting board 12 (FIG. 1) includes a generally rectangular flat surface 30 having first, second, third and fourth retaining sides 32a–32d around a periphery of the generally rectangular flat surface 30. The first and second retaining sides 32a, 32b include grooves 34 that slidably engage the tabs 26 on the sliding pieces 14a and the third and fourth retaining sides 32c, 32d include tabs 36 that slidably engage the grooves 28 in the sliding pieces 14b (FIG. 2). In one example, the sliding pieces 14 and supporting board 12 are made of a plastic material, although other types of materials s are contemplated. Other ways of slidably engaging the sliding pieces 14 with each other and with the supporting board 12 are also contemplated.

Figure 3:
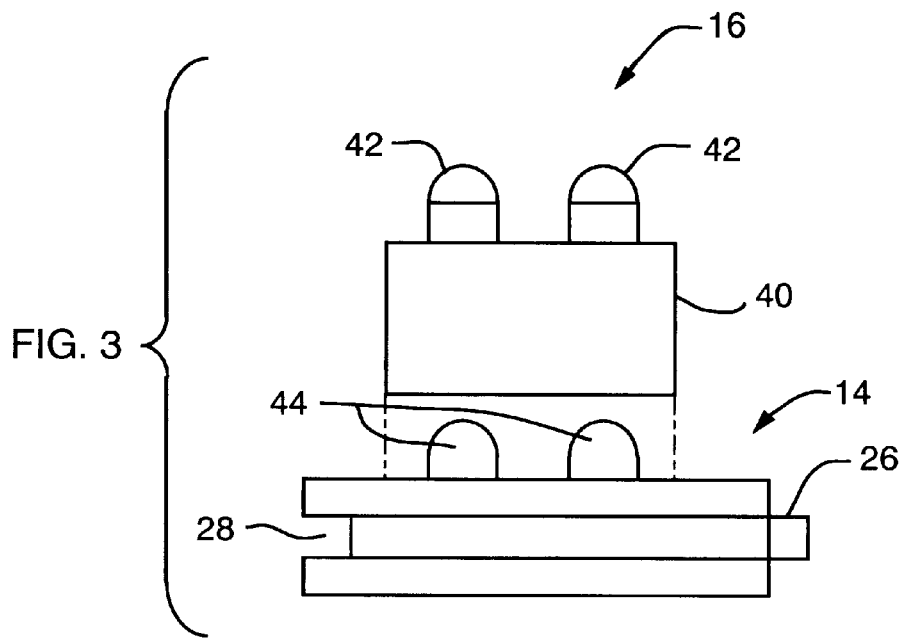
FIG. 3 is a side view of a sliding piece and a tactile recognition block used in the problem solving skills development system, according to one embodiment of the present invention.
Figure 4:
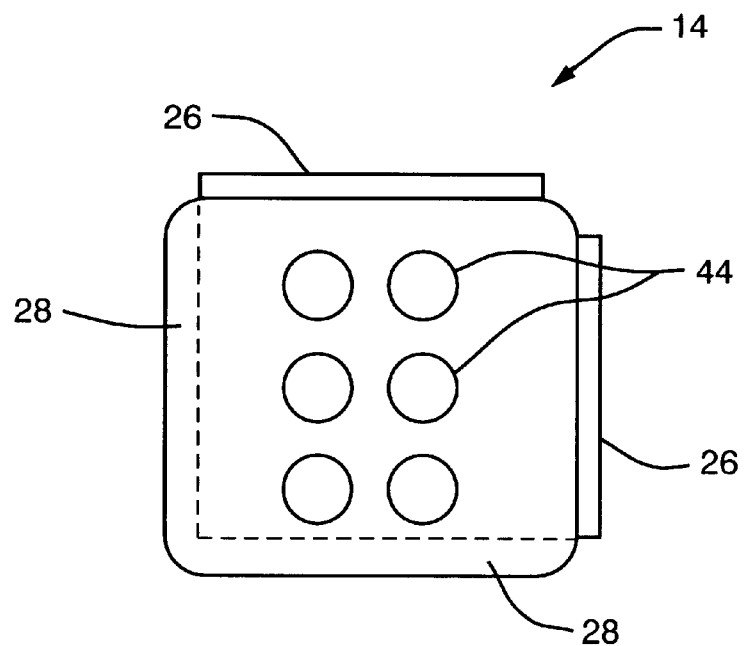
FIG. 4 is a top view of a sliding piece having block engaging members, according to one embodiment of the present invention.
Figure 5:
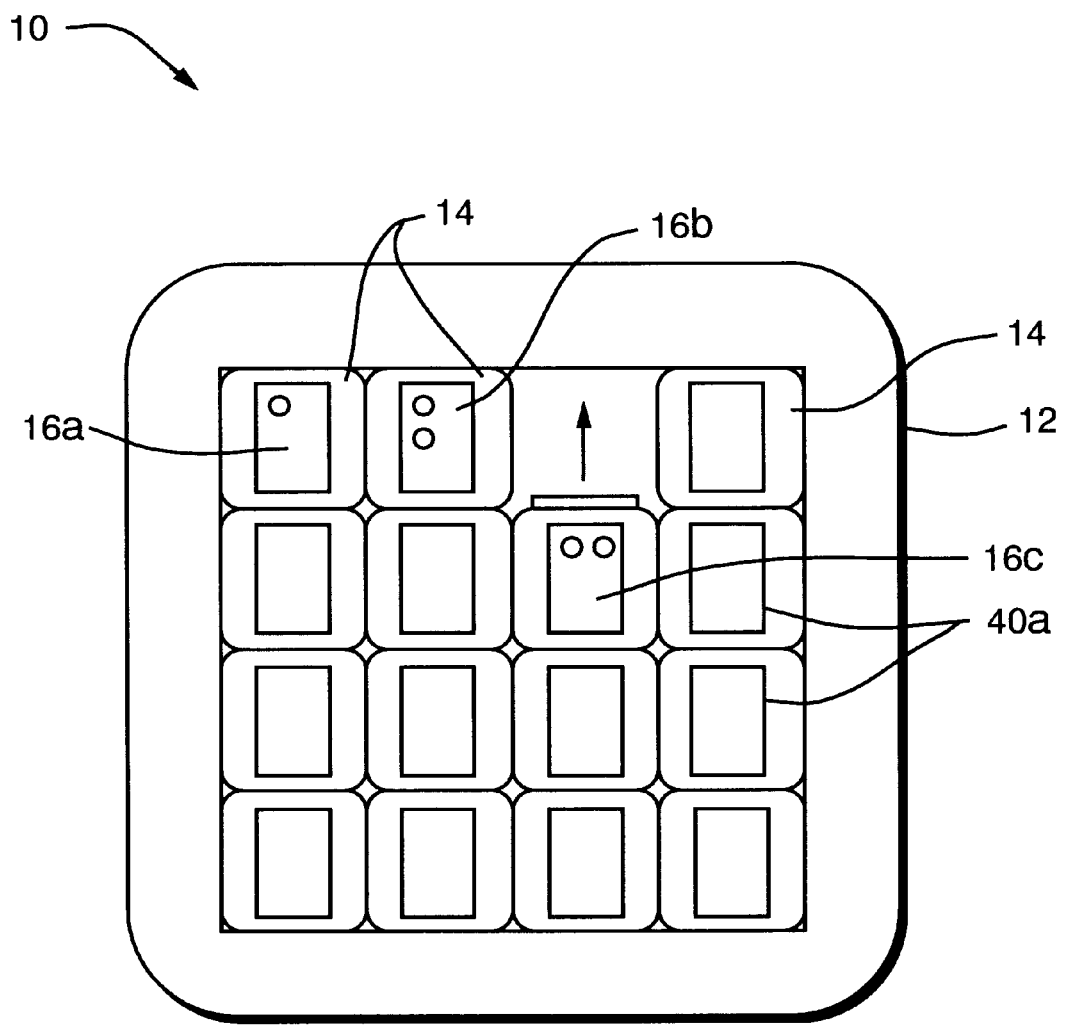
FIG. 5 is a top view of the problem solving skills development system in use, according to one application of the present invention.

In the preferred embodiment, the tactilly recognizable regions 16, FIG. 3, are disposed on tactile recognition blocks 40, such as the type disclosed in U.S. Pat. Nos. 4,880,384 and 5,391,078, incorporated herein by reference, which are removably and interchangeably coupled to the sliding pieces 14. The tactilly recognizable region 16 is preferably formed by one or more raised or protruding surfaces 42 on the tactile recognition blocks 40. The top surface of the sliding pieces 14, FIG. 4, include block engaging members 44 that removably engage the tactile recognition blocks 40. Although a particular type of block engaging member is shown, the present invention covers any way of removably engaging the blocks 40 to the sliding pieces 14. Alternatively, the tactilly recognizable region 16 is disposed directly on a surface of the sliding piece 14.

In use, the tactilly recognizable regions 16 can be randomly arranged on the supporting board 12 by shifting the sliding pieces 14 or by removing and interchanging the tactile recognition blocks 40. The visually impaired user then shifts the sliding pieces 14 to move the tactily recognizable regions 16 to the appropriate positions where the tactilly recognizable regions 16 form a pattern. In one example, the tactilly recognizable regions 16 represent the numbers from 1 to 15 and the user shifts the sliding pieces 14 until the numbers are arranged in numerical order. In another example, the tactilly recognizable regions 16 represent letters in the alphabet, for example, from "a" to "o" and the user shifts the sliding pieces 14 until the letters are arranged in order. In a further example, the tactilly recognizable regions 16 represent a word or phrase and the sliding pieces 14 are shifted to spell the word or phrase. Any type of characters or symbols can be used to form any type of pattern.

The problem solving skills development system 10 can also be adapted for a wide variety of ages and/or skill levels. For lower ages or skill levels, for example, the problem solving skills development system 10, FIG. 4, can include only a few tactilly recognizable regions 16a–16c to be arranged into a pattern with the other sliding pieces having a blank tactilly recognizable region. In the example shown, the tactilly recognizable regions 16a–16c include the Braille symbols for the letters A, B and C. The sliding pieces 14 with the tactilly recognizable regions 16a–16c can be initially located in random positions and shifted by the user until arranged in the appropriate order (e.g., ABC). The system 13 can also have fewer positions (e.g. a 3 by 3 grid) for lower ages or abilities, or greater positions (e.g. a 5 by 5 grid or more) for higher ages or abilities.

In the preferred embodiment, tactile recognition blocks 40 with different tactilly recognizable regions 16 are interchangeable such that the problem solving skills development system 10 can be adapted for different uses and/or for different abilities. The system can be used for different puzzles, for example, by replacing alphabet blocks with number blocks. Since the tactile recognition blocks 40 can have a variety of different types of characters or symbols, the puzzle can instantly be converted, for example, to music, mathematics, computer Braille code, or any foreign language Braille code. To adapt the system 10 for lower skill levels, tactile recognition blocks 40 having characters or symbols can be replaced with blank tactile recognition blocks 40a to reduce the number of characters or symbols that must be aligned.

When used with Braille, the system 10 can exploit aspects of symbolic language that are peculiar to Braille. As an example, the Braille symbol that is sometimes called "dropped f" uses the three dots, center left, center right and bottom left, and it modifies its meaning when positioned relative to other symbols. Set apart with spaces on both sides it becomes the word "to" and it retains the "to" designation when placed at the start of a word. When the "dropped f" symbol is used with a "w" and "n" appended, for example, the word "town" is formed. If the "dropped f" symbol is placed between two others, it modifies its meaning to that of "ff". The letter "o" followed by the "dropped f" symbol and then the letters "e" and "r", for example, spells the word "offer." Thus, an analytical puzzle can be created with this system 10 where the solution is the word "town" along the left or top edge, and the word "offer" proceeds in a perpendicular angle beginning at the dropped f. The eight remaining puzzled positions may be filled with blanks, or other contracted or uncontracted Braille sequences or words can be assimilated into the puzzle.

The simple act of shifting the pieces 14 to different positions and having to plan moves in advance to arrange the tactilly recognizable regions 16 into the desired pattern develops important problem solving or analytical skills that visually impaired individuals might not otherwise develop. The skills developed using this system 10 can be applied to every day activities as common as crossing the street and are often taken for granted by non-visually impaired individuals. One might consider the interchangeability of the blocks 40 a disadvantage in that the user can "cheat" by removing and rearranging the blocks. To a visually impaired individual, however, this can be considered problem solving, not cheating. Accordingly, the problem solving skills development system of the present invention can be used to develop the problem solving skills of visually impaired individuals and can be adapted for different uses by individuals of different ages/abilities.

Another use of the system 10 is in therapeutic environments to help control self-stimulating behaviors known as "blindisms". According to one type of "blindisms," a blind individual will unintentionally poke at his or her eyes because the brain has a need for stimulation. The system 10 of the present invention can be used to keep the hands occupied and prevents the hands from being used for such behavior. Although a number of applications and advantages have been described herein, the full potential of this system is not yet known.

Modifications and substitutions by one of ordinary skill in the art are considered to be within the scope of the present invention which is not to be limited except by the claims which follow.

What is claimed is:

1. A problem solving skills development system using a tactile recognition language, comprising:

a supporting board;

a plurality of sliding pieces slidably disposed on said supporting board and arranged in a grid having positions, wherein at least one of said positions is an empty position and said sliding pieces adjacent each said empty position are slidable into said empty position, whereby said sliding pieces are movable to any of said positions by shifting appropriate ones of said sliding pieces; and a plurality of tactile recognition blocks for removably engaging said sliding pieces, each of said tactile recognition blocks having a tactilly recognizable region on a surface thereof, wherein said tactilly recognizable regions on said tactile recognition blocks are arranged into a predetermined pattern by shifting said appropriate ones of said sliding pieces.

2. The problem solving skills development system of claim 1 wherein each of said sliding pieces include block engaging members for engaging said tactile recognition blocks.

3. The problem solving skills development system of claim 1 wherein said supporting board includes first, second, third and fourth retaining sides around a periphery thereof, and wherein each of said sliding pieces has first, second, third and fourth sides.

4. The problem solving skills development system of claim 3 wherein said first and second sides of each of said sliding pieces include tabs and said third and fourth sides of each of said sliding pieces include grooves, wherein said grooves and said tabs of said sliding pieces are slidably engageable, and wherein said first and second retaining sides include grooves for slideably engaging said tabs on said sliding pieces and said third and fourth retaining sides include tabs for slideably engaging said grooves on said sliding pieces.

5. The problem solving skills development system of claim 1 wherein said sliding pieces include fifteen (15) sliding pieces arranged in a 4 by 4 grid having sixteen positions.

6. The problem solving skills development system of claim 1 wherein some of said tactile recognition blocks include tactilly recognizable characters, and wherein others of said tactile recognition blocks include blank surfaces.

7. A problem solving skills development system using a tactile recognition language, comprising:

a supporting board having a generally rectangular flat surface and having first, second, third and fourth retaining sides around a periphery of said generally rectangular flat surface;

a plurality of sliding pieces slidably disposed on said rectangular flat surface and arranged in a grid having positions, wherein each of said sliding pieces has first, second, third and fourth sides engaging with at least one of the other of said sliding pieces, and wherein said retaining sides retain said sliding pieces on said generally rectangular flat surface; and a tactilly recognizable region disposed on at least two of said sliding pieces, wherein said sliding pieces are adapted to slide into said positions such that said tactilly recognizable regions on said at least two of said sliding pieces are arranged into a predetermined pattern.

8. The problem solving skills development system of claim 7 further including a plurality of tactile recognition blocks removably engageable with said sliding pieces, each of said plurality of tactile recognition blocks having said tactilly recognizable region on a surface thereof.

9. The problem solving skills development system of claim 8 wherein each of said sliding pieces include block engaging members for engaging said tactile recognition blocks.

10. The problem solving skills development system of claim 7 wherein said tactilly recognizable region is disposed on a top surface of said sliding pieces.

11. The problem solving skills development system of claim 7 wherein said first and second sides of each of said sliding pieces include tabs and said third and fourth sides of each of said sliding pieces include grooves, wherein said grooves and said tabs of said sliding pieces are slidably engageable, and wherein said first and second retaining sides include grooves for slideably engaging said tabs on said sliding pieces and said third and fourth retaining sides include tabs for slideably engaging said grooves on said sliding pieces.

12. The problem solving skills development system of claim 7 wherein at least one of said positions is an empty position, and wherein said sliding pieces adjacent said empty position are slidable into said empty position.

13. The problem solving skills development system of claim 7 wherein said sliding pieces include fifteen (15) sliding pieces arranged in a 4 by 4 grid having sixteen positions.

14. The problem solving skills development system of claim 1 wherein at least two of said tactilly recognizable regions include characters to be arranged in a predefined pattern, and wherein others of said tactilly recognizable regions include blank surfaces.

15. The problem solving skills development system of claim 8 wherein some of said tactile recognition blocks include tactilly recognizable characters, and wherein others of said tactile recognition blocks include blank surfaces.

\* \* \* \* \*